United States Patent
Zhou et al.

(10) Patent No.: US 9,098,190 B2
(45) Date of Patent: Aug. 4, 2015

(54) SYSTEMS AND METHODS FOR MESSAGING, CALLING, DIGITAL MULTIMEDIA CAPTURE AND PAYMENT TRANSACTIONS

(71) Applicants: Andrew H B Zhou, Tiburon, CA (US); Tiger T G Zhou, Tiburon, CA (US); Dylan T X Zhou, San Gabriel, CA (US)

(72) Inventors: Andrew H B Zhou, Tiburon, CA (US); Tiger T G Zhou, Tiburon, CA (US); Dylan T X Zhou, San Gabriel, CA (US)

(*) Notice: Subject to any disclaimer, the term of this patent is extended or adjusted under 35 U.S.C. 154(b) by 0 days.

(21) Appl. No.: 14/458,791

(22) Filed: Aug. 13, 2014

(65) Prior Publication Data
US 2014/0349692 A1 Nov. 27, 2014

Related U.S. Application Data

(63) Continuation of application No. 14/334,992, filed on Jul. 18, 2014, now Pat. No. 9,047,600, and a continuation-in-part of application No. 13/620,775, filed on Sep. 15, 2012, and a continuation-in-part of application No. 13/185,491, filed on Jul. 18, 2011, and a continuation-in-part of application No. 13/875,311, filed on May 2, 2013, and a continuation-in-part of (Continued)

(51) Int. Cl.
| | |
|---|---|
| G06Q 20/00 | (2012.01) |
| G06K 5/00 | (2006.01) |
| G06F 3/0488 | (2013.01) |
| G06Q 20/38 | (2012.01) |
| H04L 12/14 | (2006.01) |
| H04M 1/725 | (2006.01) |
| G06Q 20/16 | (2012.01) |
| G06Q 20/32 | (2012.01) |
| G06Q 20/40 | (2012.01) |
| H04M 1/2755 | (2006.01) |

(52) U.S. Cl.
CPC .............. *G06F 3/0488* (2013.01); *G06Q 20/16* (2013.01); *G06Q 20/322* (2013.01); *G06Q 20/3274* (2013.01); *G06Q 20/3829* (2013.01); *G06Q 20/401* (2013.01); *G06Q 20/40145* (2013.01); *H04L 12/146* (2013.01); *H04M 1/72519* (2013.01); *H04M 1/72555* (2013.01); *H04M 1/2755* (2013.01)

(58) Field of Classification Search
CPC ................... G06Q 20/3274; G06Q 20/40145; G06Q 20/401; G06Q 20/405; G06Q 20/3829; G06Q 20/16; G06Q 20/322; G06Q 30/0601; G06Q 30/00; H04M 1/2755; H04M 1/72555; H04M 1/72519; G06F 3/0488; H04L 12/146
See application file for complete search history.

(56) References Cited

U.S. PATENT DOCUMENTS

| | | | |
|---|---|---|---|
| 5,189,368 A * | 2/1993 | Chase | 324/304 |
| 7,483,061 B2 * | 1/2009 | Fredlund et al. | 348/231.4 |
| 8,208,729 B2 | 6/2012 | Foss | |
| 8,428,453 B1 * | 4/2013 | Spiegel et al. | 396/299 |

(Continued)

*Primary Examiner* — Daniel Walsh
(74) *Attorney, Agent, or Firm* — Georgiy L. Khayet

(57) ABSTRACT

Provided are computer implemented methods and systems for multimedia capture and payment transactions. According to the method, a first user input may be received. Based on the first user input, sensors may be initiated to capture multimedia. The method may further comprise receiving a second user input. Data associated with the first user input and the second user input may be analyzed. Based on the analysis, a multimedia capture mode or a payment transaction mode may be selectively selected. If the multimedia capture mode is selected, the captured multimedia may be recorded to a database. A type of the multimedia being recorded may be determined based on time between the first user input and the second user input. If the payment transaction mode is selected, transaction data may be received. Based on the transaction data, user payment data, and recipient payment data, a payment transaction may be performed.

13 Claims, 13 Drawing Sheets

Related U.S. Application Data application No. 13/661,207, filed on Oct. 26, 2012, now abandoned, and a continuation-in-part of application No. 13/623,944, filed on Sep. 21, 2012, and a continuation-in-part of application No. 13/753,855, filed on Jan. 30, 2013, and a continuation-in-part of application No. 14/154,446, filed on Jan. 14, 2014, and a continuation-in-part of application No. 13/760,214, filed on Feb. 6, 2013, now Pat. No. 9,016,565, and a continuation-in-part of application No. 13/973,146, filed on Aug. 22, 2013, and a continuation-in-part of application No. 13/776,852, filed on Feb. 26, 2013, and a continuation-in-part of application No. 13/287,279, filed on Nov. 2, 2011, and a continuation-in-part of application No. 13/857,308, filed on Apr. 5, 2013, and a continuation-in-part of application No. 13/343,044, filed on Jan. 4, 2012, and a continuation-in-part of application No. 14/165,826, filed on Jan. 28, 2014, and a continuation of application No. 14/272,939, filed on May 8, 2014, now Pat. No. 8,851,372.

(56) References Cited

U.S. PATENT DOCUMENTS

| | | | |
|---|---|---|---|
| 8,621,397 B2* | 12/2013 | Chae | 715/863 |
| 8,666,895 B2* | 3/2014 | Grigg et al. | 705/44 |
| 2001/0050883 A1* | 12/2001 | Farine et al. | 368/10 |
| 2003/0048894 A1* | 3/2003 | Mager | 379/353 |
| 2004/0187037 A1* | 9/2004 | Checco | 713/202 |
| 2005/0008148 A1* | 1/2005 | Jacobson | 380/26 |
| 2008/0046956 A1* | 2/2008 | Kulas | 725/136 |
| 2008/0059133 A1* | 3/2008 | Edwards et al. | 703/7 |
| 2008/0307594 A1* | 12/2008 | Gatzemeyer et al. | 15/105 |
| 2009/0073131 A1* | 3/2009 | Yeh | 345/173 |
| 2009/0144621 A1* | 6/2009 | Sangster et al. | 715/704 |
| 2011/0267291 A1 | 11/2011 | Choi et al. | |
| 2012/0209749 A1 | 8/2012 | Hammad et al. | |
| 2012/0259780 A1 | 10/2012 | Kang | |
| 2013/0036377 A1 | 2/2013 | Colley | |
| 2013/0320084 A1 | 12/2013 | Amada et al. | |
| 2014/0024324 A1* | 1/2014 | Mumick | 455/90.1 |

* cited by examiner

SYSTEMS AND METHODS FOR MESSAGING, CALLING, DIGITAL MULTIMEDIA CAPTURE AND PAYMENT TRANSACTIONS

CROSS-REFERENCE TO RELATED APPLICATIONS

This application is a continuation-in-part of U.S. patent application Ser. No. 13/185,491, filed on Jul. 18, 2011, titled "FACILITATING MOBILE DEVICE PAYMENTS USING PRODUCT CODE SCANNING"; U.S. patent application Ser. No. 13/287,279, entitled "METHODS AND SYSTEMS TO ADVERTISE AND SELL PRODUCTS OR SERVICES VIA CLOUD GAMING ENVIRONMENTS", filed on Nov. 2, 2011; U.S. patent application Ser. No. 13/343,044, entitled "METHODS AND SYSTEMS FOR DISPLAYING AND ADVERTISING PRODUCTS AND SERVICES USING INTERACTIVE MIXED MEDIA", filed on Jan. 4, 2012; U.S. patent application Ser. No. 13/620,775, filed on Sep. 15, 2012, titled "METHODS AND SYSTEMS FOR FACILITATING MOBILE DEVICE PAYMENTS USING CODES AND CASHBACK BUSINESS MODEL"; U.S. patent application Ser. No. 13/623,944, filed Sep. 21, 2012, titled "FACILITATING MOBILE DEVICE PAYMENTS USING PRODUCT CODE SCANNING TO ENABLE SELF CHECKOUT"; U.S. patent application Ser. No. 13/661,207, filed Oct. 26, 2012, titled "METHODS AND SYSTEMS FOR RECEIVING COMPENSATION FOR USING MOBILE PAYMENT SERVICES"; U.S. patent application Ser. No. 13/753,855, filed Jan. 30, 2013, titled "WEARABLE PERSONAL DIGITAL EYEGLASS DEVICE"; U.S. patent application Ser. No. 13/760,214, filed Feb. 6, 2013, titled "WEARABLE PERSONAL DIGITAL DEVICE FOR FACILITATING MOBILE DEVICE PAYMENTS AND PERSONAL USE"; U.S. patent application Ser. No. 13/776,852, entitled "WEARABLE PERSONAL DIGITAL FLEXIBLE CLOUD GAME, MULTIMEDIA, COMMUNICATION AND COMPUTING DEVICE", filed on Feb. 26, 2013; U.S. patent application Ser. No. 13/857,308, entitled "WEARABLE PERSONAL MINI CLOUD GAME AND MULTIMEDIA DEVICE", filed on Apr. 5, 2013; U.S. patent application Ser. No. 13/875,311, filed on May 2, 2013, titled "FACILITATING MOBILE DEVICE PAYMENTS USING MOBILE PAYMENT ACCOUNT, MOBILE BARCODE AND UNIVERSAL DIGITAL MOBILE CURRENCY"; U.S. patent application Ser. No. 13/973,146, entitled "WEARABLE AUGMENTED REALITY EYEGLASS COMMUNICATION DEVICE INCLUDING MOBILE PHONE AND MOBILE COMPUTING VIA VIRTUAL TOUCH SCREEN GESTURE CONTROL AND NEURON COMMAND", filed on Aug. 22, 2013; U.S. patent application Ser. No. 14/154,446, filed Jan. 14, 2014, titled "SYSTEMS AND METHODS FOR ISSUING MOBILE PAYMENT CARDS VIA A MOBILE COMMUNICATION NETWORK AND INTERNET-CONNECTED DEVICES"; U.S. patent application Ser. No. 14/165,826, entitled "SYSTEMS AND METHODS TO OWN A FREE COMPUTER, A FREE MOBILE DEVICE AND A FREE WEARABLE DEVICE AND LIFE TIME WARRANTY VIA THE SAME DEVICE PAYMENT CASHBACK", filed on Jan. 28, 2014; U.S. patent application Ser. No. 14/334,992, entitled "MOBILE AND WEARABLE DEVICE PAYMENTS VIA FREE CROSS-PLATFORM MESSAGING SERVICE, FREE VOICE OVER INTERNET PROTOCOL COMMUNICATION, FREE OVER-THE-TOP CONTENT COMMUNICATION, AND UNIVERSAL DIGITAL MOBILE AND WEARABLE DEVICE CURRENCY FACES", filed on Jul. 18, 2014, and U.S. patent application Ser. No. 14/272,939, filed May 8, 2014, titled "WEARABLE PERSONAL DIGITAL DEVICE WITH CHANGEABLE BENDABLE BATTERY AND EXPANDABLE DISPLAY USED AS STANDALONE ELECTRONIC PAYMENT CARD," which are incorporated herein by reference in their entireties for all purposes.

FIELD

This application relates generally to data processing and, more specifically, to methods and system for messaging, calling, capturing multimedia and payment transactions for mobile and wearable devices.

BACKGROUND

Personal digital communication devices, such as smartphones, are evolving rapidly and more and more people prefer using personal digital communication devices for a numerous purposes. One of such purposes is to capture details of everyday life, such as to record photo, video, audio, and the like multimedia content. Typically, before capturing the multimedia content, the user has to select a particular type of the multimedia content to be captured. Such selection may take additional time, and a particular moment that the user intended to capture may be missed. Furthermore, switching between different modes of the personal digital communication devices any time when the user wants to capture another type of multimedia content may be annoying for the user. The user may want to share the captured multimedia content, e.g. by sending the content via e-mail or posting the content in a user account in an online social network.

Another purpose of personal digital communication devices is to send messages to other users of personal digital communication devices. Current mobile operators enable sending text, image, or audio messages, but such kinds of service are chargeable. Furthermore, sending a file having a big size, e.g. a video file, can be problematic due to restriction of mobile operators as to the maximum size of a file to be sent. Furthermore, current messaging clients offering real-time text transmission over the Internet are supposed for a certain operation system. However, communication between users having different operation systems may be problematic.

Although available mobile operators or messaging clients (for example, Facebook Messenger, Viber, Line, Kakao Talk, Snapchat, Skype, WhatsApp Messenger) solve the problem of sending various types of multimedia messages, they do not provide any means for performing transactions between users. The users need to use a separate software or browser-based client for making payments. Additionally, the users may have to pay a transfer fee for each payment.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided is a method for multimedia capture and payment transactions for mobile and wearable devices. According to the method, a first user input may be received. Based on the first user input, one or more sensors may be initiated to capture multimedia to obtain captured multimedia. The method may further comprise receiving a second user input.

The one or more sensors may stop capturing multimedia after receiving the second user input. Upon receiving the second user input, data associated with the first user input and the second user input may be analyzed. The analysis may include determining time between the first user input and the second user input. Based on the analysis, a multimedia capture mode or a payment transaction mode may be selectively selected. If the multimedia capture mode is selected, the captured multimedia may be recorded to a database to obtain recorded multimedia. A type of the multimedia being recorded is determined based on the time between the first user input and the second user input. If the payment transaction mode is selected, transaction data may be received. The transaction data may comprise at least a payment amount and a recipient. Based on the transaction data, user payment data, and recipient payment data, a payment transaction may be performed. The user payment data and the recipient payment data may be stored in the database.

Provided also is a system for multimedia capture and payment transactions for mobile and wearable devices. The system may comprise one or more processors. The processors may be operable to receive a first user input. Based on the first user input, the processors may be operable to initiate one or more sensors to capture multimedia to obtain captured multimedia. The processors may be further operable to receive a second user input. Upon receipt of the second user input, the processors may analyze data associated with the first user input and the second user input. The analysis may include determining time between the first user input and the second user input. Based on the analysis, a multimedia capture mode or a payment transaction mode may be selectively selected. If the multimedia capture mode is selected, the processors may be operable to record the captured multimedia to a database to obtain recorded multimedia. A type of the multimedia being recorded may be determined based on the time between the first user input and the second user input. If the payment transaction mode is selected, the processors may be operable to receive transaction data. The transaction data may comprise at least a payment amount and a recipient. Based on the transaction data, user payment data, and recipient payment data, the processors may be operable to perform the payment transaction. The user payment data and the recipient payment data may be stored in the database. The database may comprise computer-readable instructions for execution by the one or more processors.

Provided is also a messaging, calling, and payment system for mobile and wearable devices and methods of using thereof. The messaging, calling, and payment system may comprise a processor and a database communicatively coupled to the processor. The processor may be configured to receive transaction data from a user. The transaction data may include at least a payment amount and a recipient. Based on the transaction data, user financial data, and recipient financial data a transaction request may be generated. The user financial data and the recipient financial data may be received from the database. The transaction request may be provided to the recipient via a display of a mobile or wearable device related to the recipient. A response to the transaction request may be received from the recipient. The response may include either a transaction confirmation or a transaction cancellation. If the transaction request is confirmed, a transaction associated with the transaction request may be performed. If the transaction request is canceled, the transaction may be not performed and a corresponding notification is sent to the user.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
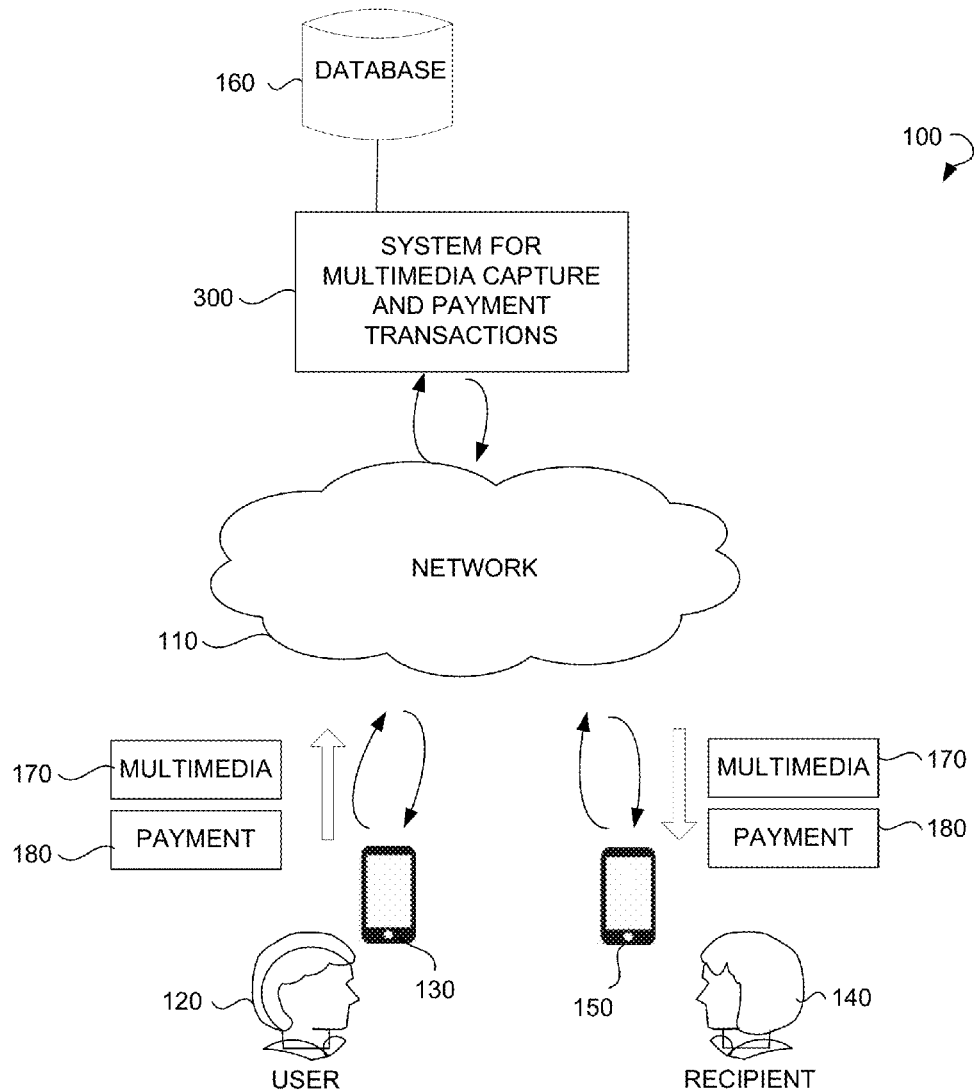
FIG. 1 shows an environment within which a method and a system for multimedia capture and payment transactions can be implemented, in accordance with example embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented methods and systems for messaging, calling, multimedia capture and payment transactions for mobile and wearable devices are described herein. Recent proliferation of mobile communication devices (e.g., a mobile phone, a smartphone, a tablet personal computer (PC), a laptop, a wearable personal digital device, and other similar devices) that are capable of capturing data and transmitting the data via a network allows implementing these methods and systems. Most users of mobile and wearable devices enjoy capturing different multimedia content, e.g. image, audio, video, and the like, and sharing the captured multimedia content with friends of the user in a social network. Additionally, performing payments using mobile and wearable devices is widely used and allows users to transfer a payment fast without visiting financial institutions, such as banks.

According to the methods and systems of the present disclosure, a haptic control may be used to select a multimedia capture mode or a payment transaction mode of a mobile and wearable device associated with the user. More specifically, a touch engagement of a user finger with a touch display of the mobile and wearable device, such as a smartphone, can be used. Furthermore, during the multimedia capture mode, one or more particular types of multimedia can be captured. The particular types of multimedia include image, audio, video, animation, text, and the like. More specifically, when the user wishes to select a multimedia capture mode or a payment transaction mode, the user starts interaction with the touch display of the mobile and wearable device. The user may touch the touch display and hold contact of the user finger or stylus for a certain amount of time. A processor of the mobile and wearable device may receive a signal about contact of the user finger with the touch display. The processor may consider the contact of the user finger with the touch display as a command to start capturing multimedia content. The processor may send a command to a sensor, such as a camera, of the mobile and wearable device to capture video.

After the certain amount of time, the user may stop touching the touch display. The processor may receive signal about absence of the touch contact of the user finger with the touch display. The processor may send a command to the sensor to stop capturing video. Furthermore, the processor may determine the duration of the touch contact of the user finger with the touch display. Based on the duration of the touch contact, the processor may initiate the multimedia capture mode or the payment transaction mode. The multimedia capture mode may have several submodes, such as a video capture mode, an image capture mode, an audio capture mode, a text capture mode, an animation capture mode, and the like. More specifically, each of the multimedia capture submodes and the payment transaction mode may correspond to certain duration of the touch contact. When the duration of the touch contact corresponds to the multimedia capture submode, the captured video is processed to obtain a particular type of multimedia. In other words, the captured video is processed to obtain text, image, audio, animation, and the like.

When the duration of the touch contact corresponds to the payment transaction mode, the user may be asked to provide transaction data, for example, a recipient and a payment amount. The user may enter the transaction data or use the transaction data stored in a memory of the mobile and wearable device or the transaction data stored on a server.

The duration of touch contact of the user finger with the touch display may be preliminarily determined for initiating capturing each type of multimedia and for initiating the payment transaction. As an example, during touch contact of the user finger with the touch display, a pictogram representing the type of the multimedia corresponding to the current contact time may be shown on the display. Similarly, when the current contact time corresponds to the payment transaction mode, a pictogram associated with performing payment transactions may be shown on the display. The duration of touch contact for capturing each type of multimedia and for payment transactions may be selected by the user or preset by the processor.

Furthermore, the methods and system of the present disclosure refer to a cross-platform instant messaging subscription service for mobile and wearable devices. A cross-platform application can be directly run on any platform without special preparation. In particular, the cross-platform instant messaging subscription service may run on Android, iOS, BlackBerry OS, Symbian, Windows Phone, and so forth. Instant messaging provides for real-time text transmission over the Internet. The cross-platform instant messaging subscription service uses the same network the users use for email communication and web browsing. Therefore, the cross-platform instant messaging subscription service allows the users to exchange messages without having to pay mobile operators for message transmission. The messages that can be sent by the users include text, image, audio, video, geographical location massages, and so forth. The users can pay a subscription price to have an access to the service for a certain period of time. In example embodiments, the message communication is provided using a free cross-platform messaging service, a free Voice over Internet Protocol (VoIP) service, a free Over-the-Top (OTT) service, and so forth.

The messaging, calling, and payment system enables registered users to send and receive payments. The mobile payment service may be associated with a virtual currency and provide virtual currency transactions between users. The mobile payment service enables worldwide peer-to-peer transactions between the users.

The virtual currency of the mobile payment service may be an encrypted currency that may use cryptography to control creation and transfer of the currency. In order to increase security of the currency, the currency may be customized according to user personal data. For example, the user sends a currency request to the mobile payment service. In response to the currency request, the mobile payment service creates virtual currency associated with the user. In particular, user personal data can be present on the virtual currency, for example, an image of a user face can be provided on the virtual currency. Such currency having the user face printed on it can be referred to as "universal digital mobile and wearable device currency faces" or "currency faces".

The methods described herein may be performed by any mobile devices with wireless communication capabilities. In addition to being capable of transmitting voice-based signals, many modern cell phones have internet connectivity using cellular networks (e.g., 3G, 4G) as well as Wi-Fi and other types of networks.

Referring now to the drawings, FIG. 1 illustrates an environment 100 within which a method and a system for multimedia capture and payment transactions can be implemented. The environment 100 may include a network 110, a user 120, a mobile and wearable device 130 associated with the user 120, a recipient 140, a mobile and wearable device 150 associated with the recipient 140, a system 300 for multimedia capture and payment transactions, and a database 160. The mobile and wearable 130 and the mobile and wearable 150 may include a mobile phone, a lap-top, a PC, a tablet PC, a smart phone, a wearable personal digital device, a wearable eyeglass communication device, a handheld computing device, a smartphone, a tablet computer, a personal digital assistant, a e-textile item, an activity tracker, a smartwatch, smartglasses, a Global Positioning System (GPS) watch, a mixed reality device, a computer-mediated reality device, a clothing technology device, and a wearable device, and so forth. The mobile and wearable 150 may a band adapted to secure the mobile and wearable 150 on a human body, the human body including a wrist, an arm, a neck, a head, a leg, a waist, an ear, a finger, and any other part of the human body.

The band may be adapted to secure the mobile and wearable 150 under, within or on clothing, and wherein the band includes a rechargeable battery configured to power the mobile and wearable 150.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication.

The user 120 may include a person that performs capturing multimedia, sending multimedia messages 170 and performs transaction of payments 180 to the recipient 140. The user 120 may use haptic control to select a multimedia capture mode or a payment transaction mode on the mobile and wearable device 130. The multimedia may include different multimedia types, such as text, image, audio, video, animation, and the like. The payment 180 may be associated with digital currency. The captured multimedia and payment data may be stored in the database 160.

The user 120 may capture multimedia and send the multimedia message 170 including the captured multimedia to the recipient 140. The recipient 140 may use the mobile and wearable device 150 to receive and review the multimedia message 170 received from the user 120. In an example embodiment, the user may send the multimedia message 170 to an e-mail address, a social network account, or the like of the recipient 140.

Furthermore, the user 120 may select an amount of payment 180 to be transferred to the recipient 140 and send a transfer request to the system 300 for multimedia capture and payment transactions. The system 300 for multimedia capture and payment transactions may transfer the amount of the payment 180 to the mobile and wearable device 150.

A payment transaction may be based on one or more of the following: based on Unstructured Supplementary Service Data (USSD), Short Message Service (SMS), direct operator billing, a credit card mobile payment, an online wallet, a Quick Response (QR) code payment, contactless near field communication, a cloud-based mobile payment, an audio signal-based payment, a Bluetooth Low Energy (BLE), signal beacon payment, an in-application payment, a social networking payment, a trade token payment, a merchant token payment, a currency token payment, a direct carrier and bank co-operation, and so forth.

Figure 2:
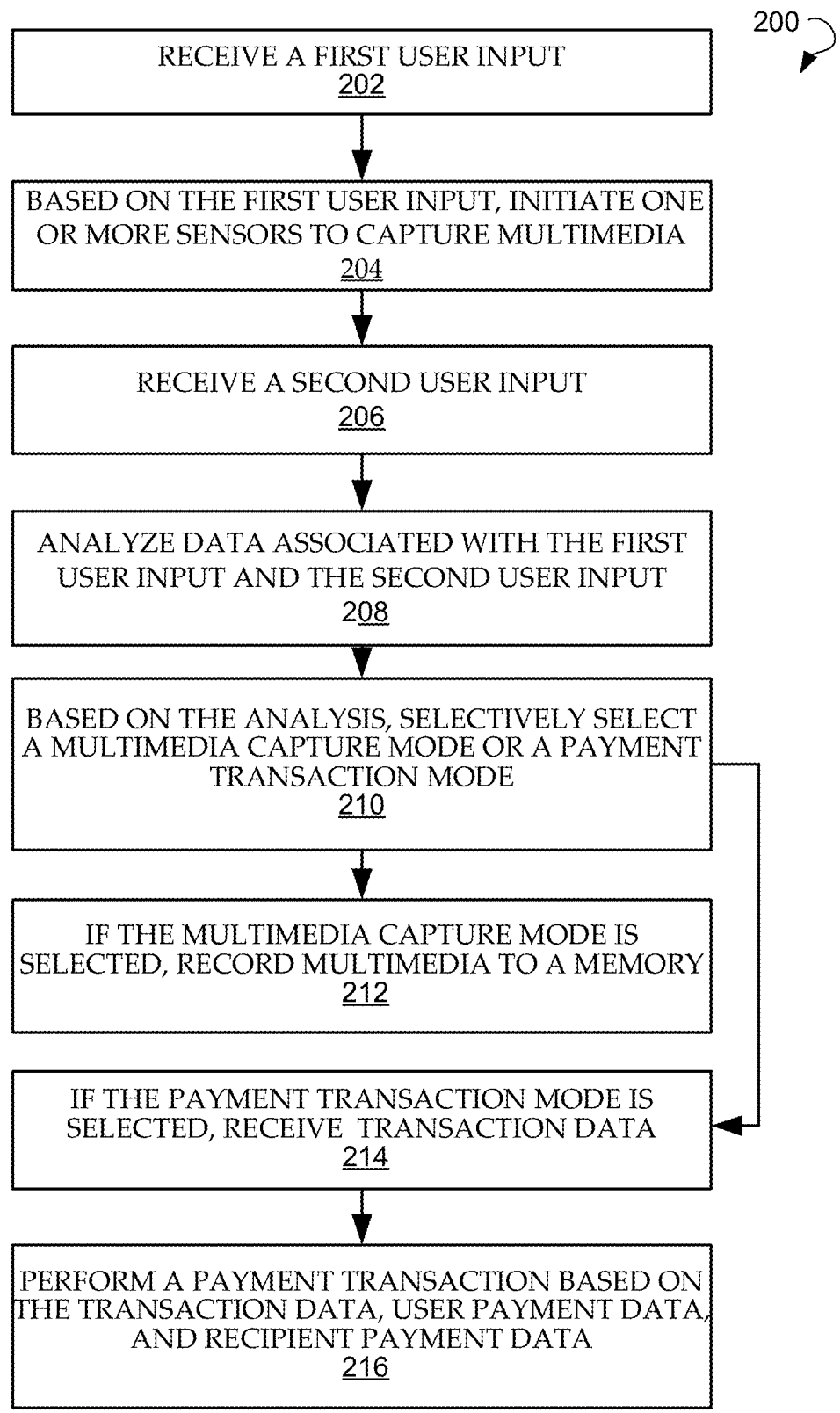
FIG. 2 is a flow chart illustrating a method for multimedia capture and payment transactions, in accordance with example embodiments.

FIG. 2 is a flow chart illustrating a method 200 for multimedia capture and payment transactions for mobile wearable devices, in accordance with certain embodiments. The method 200 may start with receiving, by one or more processors, a first user input at operation 202. In certain embodiments, the first user input may include touch engagement of the user with a display of the mobile and wearable device. The display may include a touch display. The user can touch the display with a user finger or a stylus.

At operation 204, based on the first user input, one or more sensors may be initiated to capture multimedia. As a result, captured multimedia may be obtained. In an example embodiment, the captured multimedia may include video. All types of multimedia may be derived and recorded from the captured multimedia, i.e. from the captured video. More specifically, the text may be recorded from the captured video based on one or more of text recognition and speech recognition. The image may be recorded from the captured video by selecting a frame in the captured video and storing the frame as an image. The audio may be recorded from the captured video by storing an audio content of the captured video. The animation may be recorded from the captured video by selecting two or more frames in the captured video. The selected frames may be cycled to obtain several images shown one after another. After the last image, the first image may be shown to obtain a continuous animation.

The method 200 may continue with receiving, by the one or more processors, a second user input at operation 206. In an example embodiment, the second user input may include touch release of the user from the display of the mobile and wearable device. After receiving the second user input, the one or more sensors may be stopped. Therefore, capturing the multimedia may be stopped after receiving the second user input.

Upon receiving the first user input and the second user input, data associated with the first user input and the second user input may be analyzed at operation 208. The analysis may be based on determining time between the first user input and the second user input.

Based on the analysis, a multimedia capture mode or a payment transaction mode may be selectively selected at operation 210. More specifically, the multimedia capture mode and the payment transaction mode may correspond to a particular predetermined time between the first user input and the second user input.

If the multimedia capture mode is selected at operation 210, the method 200 may continue with operation 212 at which multimedia may be recorded to a memory to obtain recorded multimedia. A type of the multimedia being recorded may be determined based on the time between the first user input and the second user input. In an example embodiment, the type of the multimedia may include text, video, image, audio, animation, and the like. Optionally, the method 200 may further comprise sending the recorded multimedia to the recipient. In an example embodiment, the user may select the recipient from a contact list stored on the mobile and wearable device.

If the payment transaction mode is selected at operation 210, the method 200 may continue with operation 214 at which transaction data may be received. In an example embodiment, the user may be requested to provide the transaction data. The transaction data may comprise at least a payment amount and a recipient. In an example embodiment, the recipient payment data may include one or more of recipient bank account data, recipient debit card data, recipient credit card data, a recipient phone number, recipient virtual currency wallet data, and the like. The recipient may be selected from a contact list, a list of recent calls, a list of recent transactions on the mobile and wearable device of the user, and the like.

At operation 216, a payment transaction may be performed based on the transaction data, user payment data, and recipient payment data. The user payment data and the recipient payment data may be stored in a database. In an example embodiment, the payment transaction may include transferring a payment from a payment account associated with the user to a payment account associated with a recipient. The recipient payment data may be encrypted by assigning a unique key which is sent to an encryption verification unit having a key storage.

In a further example embodiment, the payment transaction may be performed in a digital currency. The digital currency may be customized according to personal data of the user or personal data of the recipient. The customization may include printing an image on the digital currency. The image may include an image of a user face. In some embodiments, to provide the digital currency with an artistic value, the image may be an image of a public figure, a fashion designer, a movie character, and so forth. The user may select his portrait for printing on the digital currency. The image of the user face may be stored in a memory of the mobile and wearable device of the user or on a remote server. Alternatively, the user may capture an image of the user face using a camera of the mobile and wearable device of the user.

After performing the transaction, the method 200 may optionally comprise receiving a currency conversion request from the recipient. In response to the currency conversion request, the digital currency received from the user may be converted into a digital currency associated with the recipient. In particular, the conversion may include replacing the image of the use face on the digital currency with an image of a recipient face. The image of the recipient face may be stored in a memory of the mobile and wearable device of the recipient or on a server. Alternatively, the recipient may capture an image of the recipient face using a camera of the mobile and wearable device of the recipient.

The method 200 may optionally comprise modifying the recorded multimedia. Thereby, the modified multimedia can be obtained. In an example embodiment, the modifying may include one or more of the following: creating voices for online video games and avatars, voice disguising for anonymity over the radio or internet, changing voices for voiceovers and audio projects, modify user voice based on user preferences, such as make the voice sound like a man, woman, or a child, and so forth. Furthermore, audio effects can be applied to any multimedia files existing on the mobile and wearable of the user. In a further example embodiment, the method 200 may optionally comprise applying audio effects to the multimedia during the capture of multimedia, e.g. using a microphone. The recorded multimedia may be converted into Encrypted Trusted Data Format (ETDF).

Figure 3:
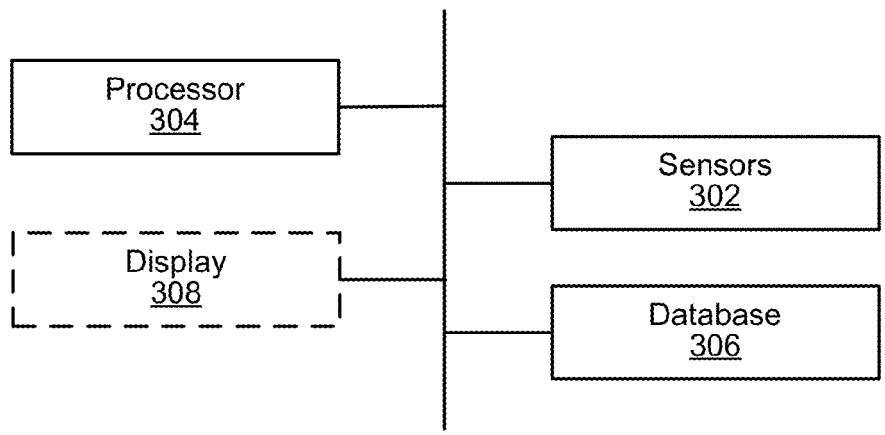
FIG. 3 is a block diagram showing various modules of a system for multimedia capture and payment transactions, in accordance with example embodiments.

FIG. 3 is a block diagram showing various modules of a system 300 for multimedia capture and payment transactions for mobile and wearable devices, in accordance with certain embodiments. Specifically, the system 300 may include one or more sensors 302. In an example embodiment, the sensors 520 may include a camera. The sensors 320 may be operable to capture multimedia to obtain captured multimedia.

The system 300 may further comprise one or more processors 304. The processor 304 may be operable to receive a first user input. In an example embodiment, the first user input includes touch engagement of the user with a display of the mobile and wearable device.

Based on the first user input, the processor 304 may be operable to initiate the one or more sensors 302 to capture multimedia. In an example embodiment, the captured multimedia includes video. The processor 304 may be further operable to receive a second user input. In an example embodiment, the second user input includes touch release of the user from a display of the mobile and wearable device. Based on the second user input, the processor 304 may be operable to stop the one or more sensors 302 thereby stopping capturing the multimedia. In an example embodiment, the processor 304 may be further operable to analyze data associated with the first user input and the second user input. The analysis may include determining time between the first user input and the second user input. Based on the analysis, the processor 304 may be operable to selectively select a multimedia capture mode or a payment transaction mode.

In an example embodiment, if the multimedia capture mode is selected, the processor 304 may be operable to record multimedia to obtain recorded multimedia. A type of the multimedia being recorded may be determined based on the time between the first user input and the second user input. The type of the multimedia may include text, video, image, audio, animation, and the like. In example embodiments, the captured multimedia may include video. The text may be recorded from the captured video based on text recognition and speech recognition. The image may be recorded from the captured video by selecting a frame in the captured multimedia. The audio may be recorded from the captured video by recording audio content in the captured video. The animation may be recorded from the captured video by selecting two or more frames in the captured video and cycling the selected two or more frames.

If the payment transaction mode is selected, the processor 304 may be operable to receive transaction data. The transaction data may comprise at least a payment amount and a recipient. In an example embodiment, the user may select the recipient from one or more of a contact list, a list of recent calls, a list of recent transactions on the mobile and wearable device of the user, and so forth. The processor 304 may be further operable to perform a payment transaction based on the transaction data, user payment data, and recipient payment data. In an example embodiment, the payment transaction may include transferring a payment from a payment account associated with the user to a payment account associated with a recipient. In a further example embodiment, the payment transaction may be performed in a digital currency.

The system 300 may further comprise a database 306. The database 306 may comprise computer-readable instructions for execution by the one or more processors. In an example embodiment, the user payment data and the recipient payment data may be stored in a database 306.

In an example embodiment, the user and the recipient may be registered in the system 300 for multimedia capture and payment transactions. Upon registration, the user may provide the user payment data and the recipient may provide the recipient payment data to the system 300. The recipient payment data may include one or more of recipient bank account data, recipient debit card data, recipient credit card data, a recipient phone number, recipient virtual currency wallet data, and the like.

The system 300 may further optionally include a display 308. In an example embodiment, the display 308 includes a touch display.

In various embodiments, the multimedia may include a text, a video, an image, an audio, an animation, a geographical location, and sp forth.

The system 300 for multimedia capture and payment transactions is a proprietary, cross-platform instant messaging subscription service for mobile and wearable devices and uses internet for communication. The cross-platform instant messaging subscription service allows users to communicate with peers by voice using a microphone, video by using a webcam. Phone calls may be placed to recipients on the traditional telephone networks. Calls to other users within the service are free of charge. The system 300 is a hybrid peer-to-peer and client-server system. It makes use of background processing on computers running application software.

A web-based chat feature may be integrated with the system 300 and built on the open MQTT protocol. The chat feature lets users chat with friends both on mobile and on the main website, provide hold-to-talk voice messaging, broadcast (one-to-many) messaging, sharing of photographs and videos, location sharing, and so forth.

In some embodiments, the system 300 can exchange contacts with people nearby via Bluetooth, as well as providing various features for contacting people at random if desired, and integration with social networking services. Photographs may also be embellished with filters and captions. Additionally, a machine translation service is available.

Figure 4:
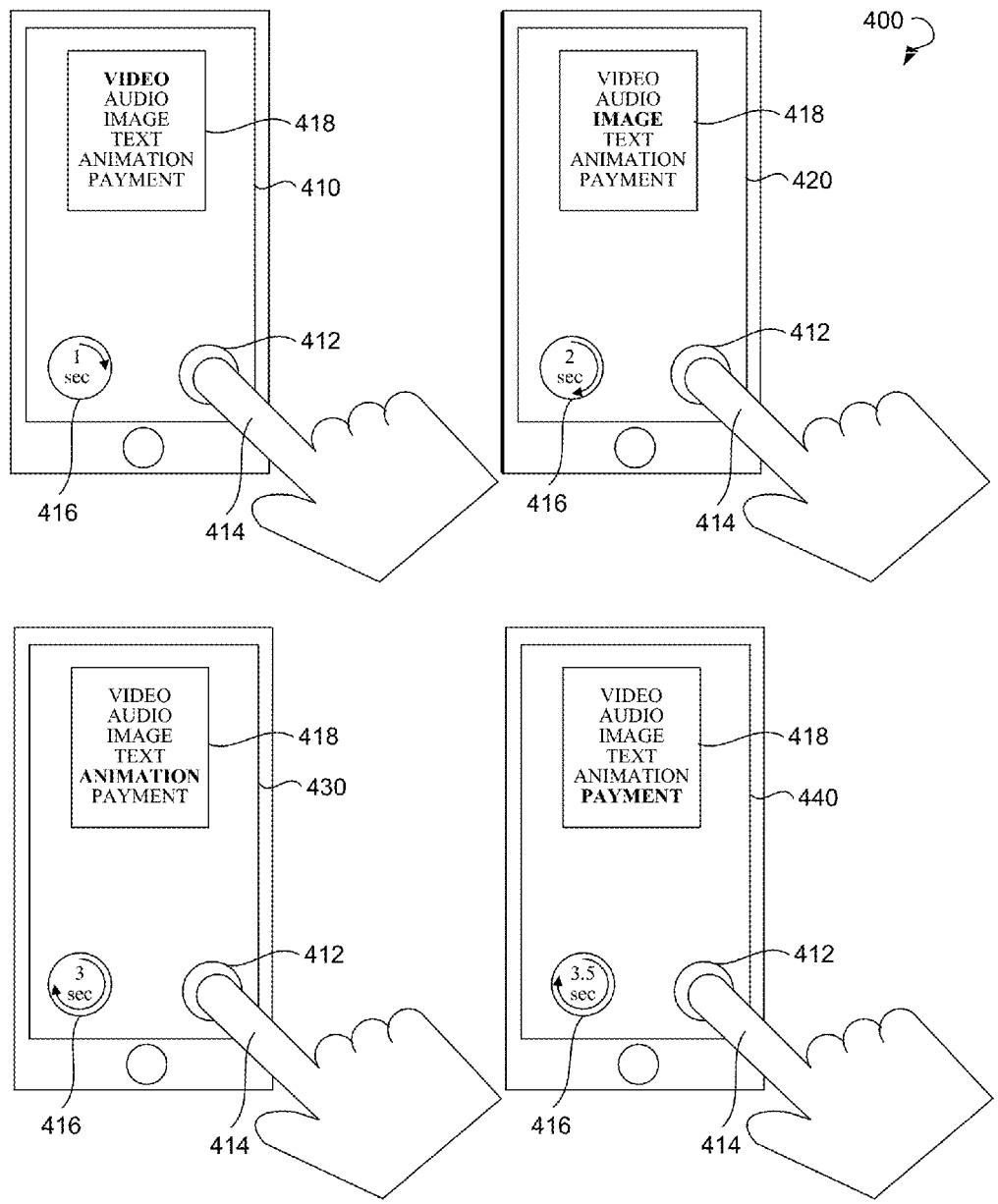
FIG. 4 is a schematic representation for selection of a multimedia capture mode or a payment transaction mode, according with an example embodiment.

FIG. 4 is a schematic representation for selection of a multimedia capture mode or a payment transaction mode, according to an example embodiment. The user may touch a mode selection icon 412 with a user finger 414 on a screen 410. A timer 416 may show touch contact time of the user finger 414 with the screen 410. A menu 418 representing all available modes may be displayed on the screen 418. The modes may include a multimedia capture mode and a payment transaction mode. The multimedia capture mode may include several submodes, such as a video capture mode, an audio capture mode, an image capture mode, a text capture mode, an animation capture mode, and so forth. Each submode of the multimedia capture mode, as well as the payment transaction mode may correspond to a predetermined touch contact time. In an example embodiment, the multimedia capture mode may correspond, for example, to the touch contact time of 1 to 3 seconds. For example, the video capture mode may correspond to the touch contact time of 1 second. Therefore, after the user touches the mode selection icon 412 for 1 second and then stops touching the mode selection icon 412, the video capture mode may be initiated. Similarly, the audio capture mode (not shown) may correspond, for example, to the touch contact time of 1.5 seconds. The image capture mode may correspond, for example, to the touch contact time of 2 seconds, as shown on a screen 420. Similarly, the text capture mode (not shown) may correspond, for example, to the touch contact time of 2.5 seconds. The animation capture mode may correspond, for example, to the touch contact time of 3 seconds, as shown on a screen 430.

Similarly, the payment transaction mode may correspond, for example, to the touch contact time of 3.5 second, as shown on a screen 440. Therefore, after the user touches the mode selection icon 412 for 3.5 seconds and then stops touching the mode selection icon 412, the payment transaction mode may be initiated.

Figure 5:
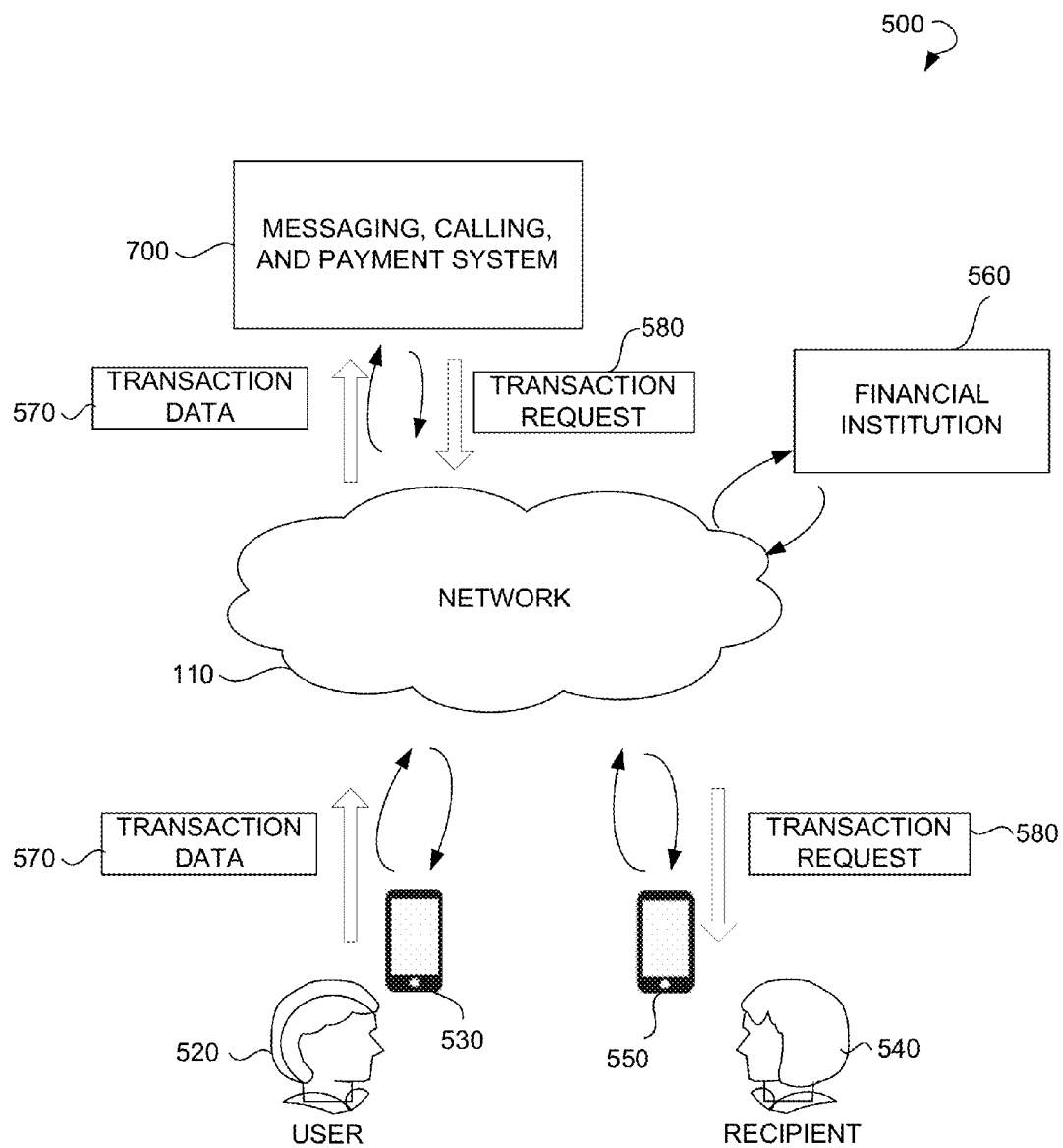
FIG. 5 illustrates is a representation of sending messages and requesting a payment from a recipient, in accordance with some embodiments.

FIG. 5 is a representation 500 of sending messages and requesting a payment from a recipient. The representation 500 shows a network 110, a user 520, a mobile and wearable device 530 associated with the user 530, a recipient 540, a mobile and wearable device 550 associated with the recipient 540, the messaging, calling, and payment system 700, and a financial institution 560.

The user 520 may include a person that sends text and multimedia messages, and transaction data 570 to request a payment from the recipient 540. The multimedia may include different multimedia types, such as text, image, audio, geographical location, video, animation, and the like. The transaction data 570 may include a payment amount, an identifier (user name or nickname) of the user 520 and an identifier of the recipient 540. Identifiers may be associated with the user financial data and the recipient financial data correspondingly. The user financial data (user banking account, user credit or debit card number and validity date, cardholder name, user virtual currency wallet data, and so forth) may be specified by the user 520 during registration with the messaging, calling, and payment system 700 and stored in the database of the messaging, calling, and payment system 700. Similarly, the recipient financial data (recipient banking account, recipient credit or debit card number and validity date, cardholder name, recipient virtual currency wallet data, and so forth) may be specified by the recipient 540 during registration with the messaging, calling, and payment system 700 and stored in the database of the messaging, calling, and payment system 700.

The transaction data 570 may be received from the user 520 by the messaging, calling, and payment system 700 and processed to generate a transaction request 580. The transaction request 580 may be generated based on the transaction data 570 and the user financial data and the recipient financial data stored in the messaging, calling, and payment system 700. The transaction request 580 may be sent to the recipient 540. The transaction request may be sent in a truncated state, that is the user financial data may be excluded from the sent transaction request 580. The recipient may only see the identifier of the user 520, the requested payment amount, and/or comments of the user 520. To protect the user financial data, the user financial data is not transmitted to the recipient 540.

On receiving the transaction request 580, the recipient 540 may confirm or cancel the payment requested by the transaction request 580. If the transaction request is confirmed, the messaging, calling, and payment system 700 receives the transaction request confirmation and transfers the payment amount from the account of the recipient 540 to the account of the user 520. In some embodiments, the transaction request 580 after its approval is transmitted for processing to the financial institution 560.

In some embodiments, the recipient financial data may include two or more recipient banking accounts and/or recipient credit or debit cards. When approving the transaction request 580, the recipient 540 may select the account from which the payment amount will be transferred.

Access to the messaging, calling, and payment system may be controlled by one or more of the following: a password, a Personal Identification Number (PIN) code, and biometric authorization, the biometric authorization including fingerprint scanning, palm scanning, face scanning, and retina scanning. The scanning may be performed using the one or more biometric sensors. For example, the mobile and wearable device may comprise a fingerprint reader configured to scan a fingerprint, the scanned fingerprint being matched to one or more approved fingerprints. Access to the system may be granted based on the matching.

Figure 6:
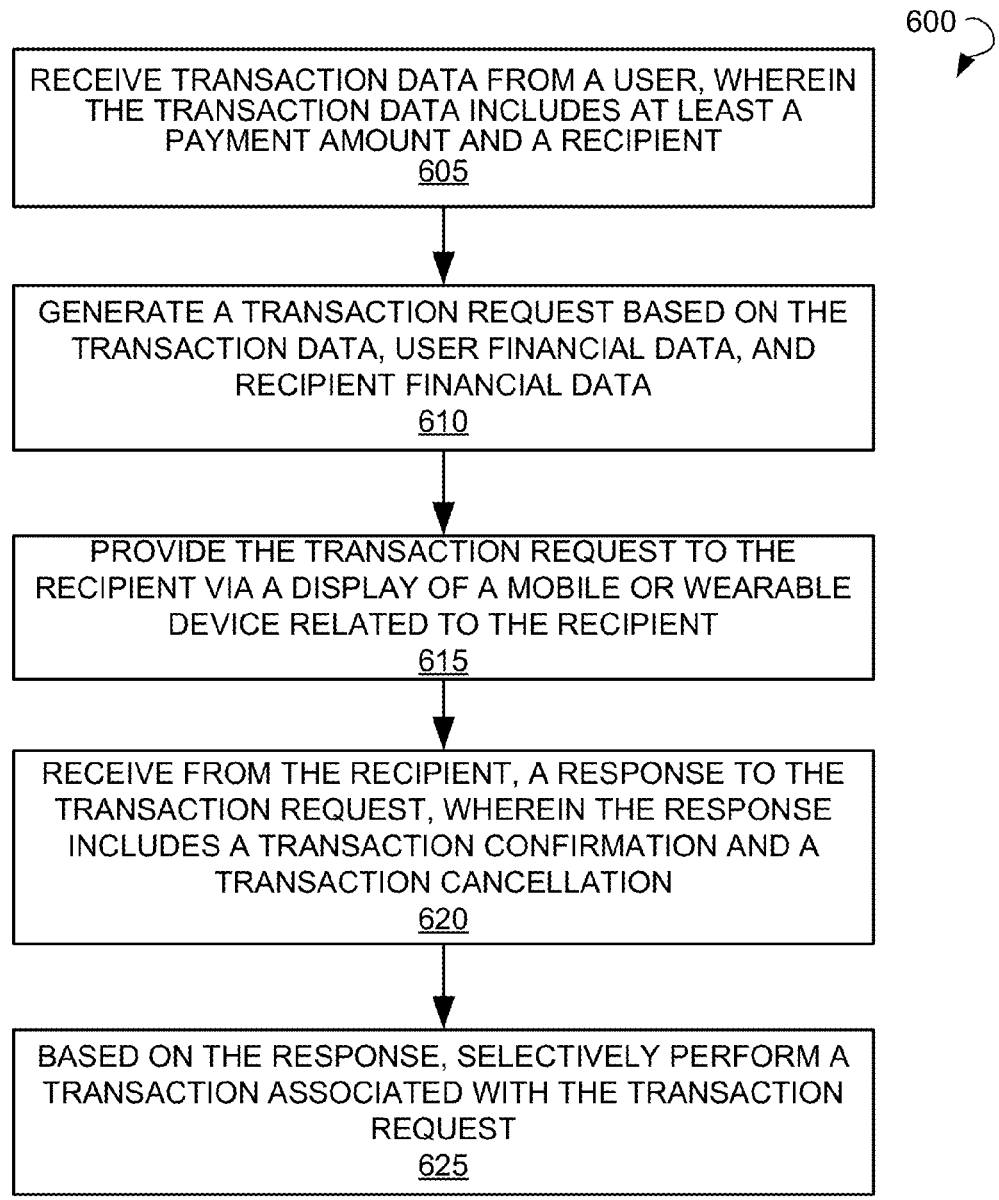
FIG. 6 is a flow chart illustrating a method for using a messaging, calling, and payment system, in accordance with certain embodiments.

FIG. 6 is a flow chart illustrating a computer implemented method 600 for using the messaging, calling, and payment system, in accordance with certain embodiments. The method 600 may start with receiving, by one or more processors, transaction data from a user at operation 605. The transaction data may include a payment amount and a recipient. The recipient may be defined by a recipient identifier. The recipient identifier may be specified by the recipient during registration in the messaging, calling, and payment system and may include a nickname, a phone number of the recipient, a code number, and so forth.

Based on the transaction data received from the user and user financial data and recipient financial data stored in the database, a transaction request may be generated by operation 610. The transaction request may include data required for a payment transfer, for example, a receiving account, an issuing account, a payment amount, and so forth. The generated transaction request may be truncated to exclude sensitive information (e.g., user and recipient accounts), and provided to the recipient via a display of a mobile or wearable device related to the recipient at operation 615. The mobile or wearable device may include an activity tracker, a smartwatch, smartglasses, a Global Positioning System (GPS) watch, a mixed reality device, a computer-mediated reality device, a clothing technology device, a e-textile item (e.g., Smart Shirt, smart bracelet, smart ring, and other internet-connected devices and internet of things devices). The transaction request may be provided with a capability to confirm or cancel the transaction associated with the request.

At operation 620, a response to the transaction request may be received from the recipient. The response may include either a transaction confirmation or a transaction cancellation. If the transaction request was confirmed, the transaction associated with the transaction request may be performed at operation 625. If the transaction is cancelled, a cancellation notification is provided to the user.

When the transaction is performed, the payment amount may be transferred from the payment account associated with the recipient to the payment account associated with the user. In some embodiments, a notification of the transaction status may be sent to the user and/or recipient.

In some embodiments, the transaction may be performed in a virtual currency. Additionally, the virtual currency may be customized according to data associated with the user or the recipient. In an example embodiment, the customization includes printing an image on the virtual currency. The image may include an image of a user face or a recipient face.

In a further example embodiment, the virtual currency includes an encrypted currency, also referred to as cryptocurrency. The encrypted currency is encrypted using principles of cryptography being a technology used in online banking. Unlike fiat currency with central banks and online banking, the encrypted currency discussed herein is created using peer reviewed cryptographic ciphers, thus removing the need to trust a central authority. Thus, transfer of the encrypted currency does not require trust of any third party.

Upon encryption of the transaction data, a transaction of the currency to the user is performed based on the transaction request. After performing the transaction, the method 600 optionally comprises receiving a currency conversion request from the user. In response to the currency conversion request, the currency received from the recipient is converted into a currency associated with the user. In particular, the conversion includes replacing the image on the virtual currency with an image of a user face.

Printing the face on the virtual currency is an additional security feature that enables worldwide peer-to-peer transactions with no risk of chargeback or fraud. At the same time, both user and recipient are immune to seizure or confiscation of the currency.

Figure 7:
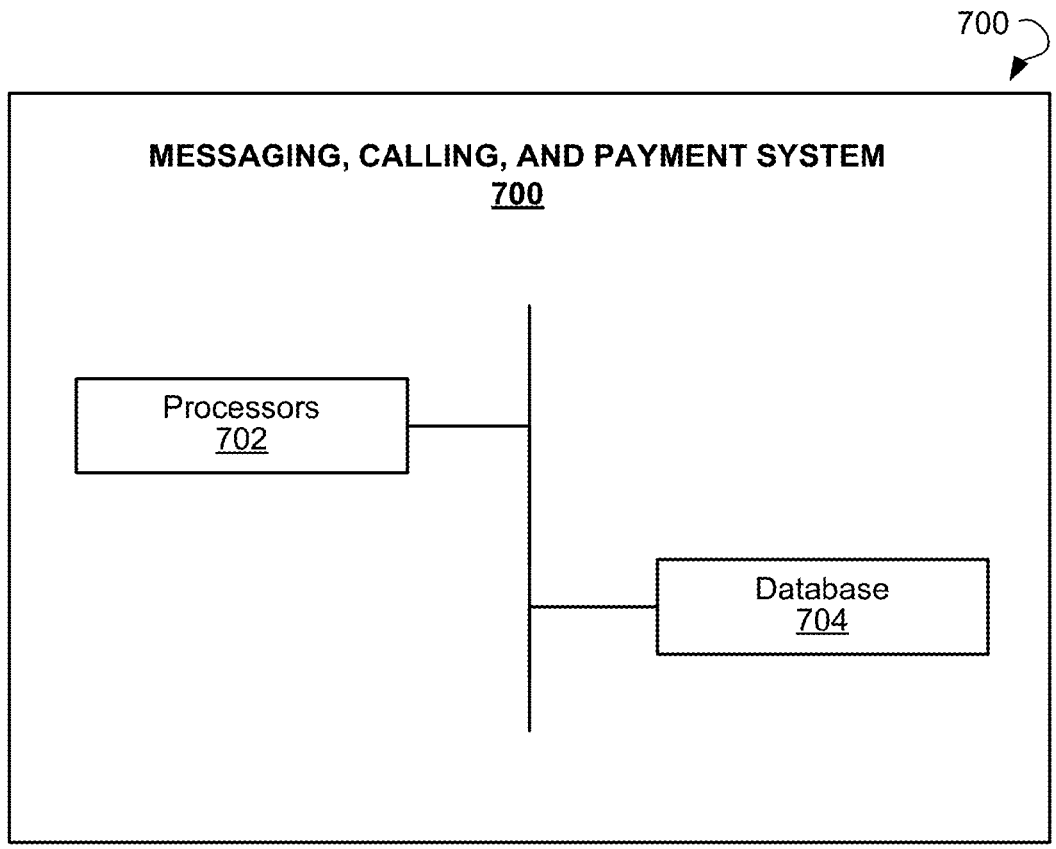
FIG. 7 is a block diagram showing various modules of a messaging, calling, and payment system, in accordance with certain embodiments.

FIG. 7 is a block diagram showing various modules of a messaging, calling, and payment system 700, in accordance with certain embodiments. Specifically, the system 700 may include one or more processors 702. The processors 702 may be operable to receive transaction data from the user, generate a transaction request based on the transaction data, user financial data, and recipient financial data and send the transaction request to the recipient. Furthermore, the processors 702 may be operable to receive a recipient response to the transaction request and selectively perform a transaction associated with the transaction request.

The system 700 may further comprise a database 704 comprising computer-readable instructions for execution by the one or more processors 702.

In example embodiments, the messaging, calling, and payment system 700 may also enable the user, recipient, and further users to exchange text and multimedia messages and make calls. The messaging, calling, and payment system 700 may be a peer-to-peer payment service and may provide at least a cross-platform messaging service, a VoIP service, and an OTT service. The VoIP service allows for the delivery of voice communications and multimedia sessions over Internet Protocol (IP) networks, such as the Internet. The VoIP is associated with IP telephony, Internet telephony, voice over broadband (VoBB), broadband telephony, IP communications, and broadband phone service. The OTT service refers to delivery of video, audio and other media over the Internet without a mobile provider being involved in the control or distribution of the content. A mobile provider may be aware of the contents of the IP packets but is not responsible for, nor able to control, the viewing abilities, copyrights, and/or other redistribution of the content.

The processors 702 may be further are operable to control home appliances and applications through gestures; recognize gesturing of letters in the mid air as a text; settle payment of bills in one action by making a single gesture; detect incoming payments transmissions and alerts through built-in vibration and light-emitting diodes; use Global Positioning System, iBeacon, or a Bluetooth low energy beacon to make payments at retail stores, restaurants, and make person-to-person payments; make direct payment by tracking a number with a finger; make payments between the mobile and wearable devices; make payments by gesturing a checkmark; provide hold-to-talk voice messaging, broadcast (one-to-many) messaging, sharing of photographs, videos, and location; exchange contacts with one or more further users via Bluetooth; and provide features for contacting people at random, integration with social networking services, machine translation, and embellishing photographs with filters and captions.

In some embodiments, the system 700 may further comprise a camera (not shown) configured to provide video calls and capture one or more barcodes. The one or more barcodes may include electronic key data, a link to a web-resource, a payment request, advertising information, and other information. The one or more barcodes may include a linear dimensional code, a two-dimensional code, a three-dimensional code, a snap tag code, a Quick Response (QR) code, and other machine readable code. Additionally, the system 700 may include a microphone to provide audio calls. The audio calls within the system are free of charge. The system is a hybrid peer-to-peer and client-server system.

The messaging, calling, and payment system 700 may be configured to act as one or more of a smart card, a proximity card, an IC card, a magnetic strip card, and an electronic payment card, the electronic payment card storing card data of one or more debit cards, credit cards, gift cards, loyalty cards, prepaid cards, membership cards, merchant cards, EMV cards, other smart and IC cards. The system 700 may be compatible with one or more of the following network standards: GSM, CDMA, LTE, IMS, Universal Mobile Telecommunication System (UMTS), RFID, 4G, 5G, 6G, 7G, 8G, 9G and upper. The system 700 the system may be a proprietary, cross-platform instant messaging subscription service for smartphones and selected feature phones that uses Internet for communication. The system can be built on an open MQTT protocol, provide multimedia communication and payment services and have integrated web-based chat feature.

In some embodiments, the system 700 may further comprise an operating system executing on the processor, the operating system including Android, iOS, Firefox OS, window system, wearable OS, and other operating systems.

Additionally, the system may be associated with one or more of an application programming interface (API) and a software development kit (SDK), and wherein mobile and wearable devices are adapted to be scanned by a Point-of-Sale (POS) system.

Figure 8:
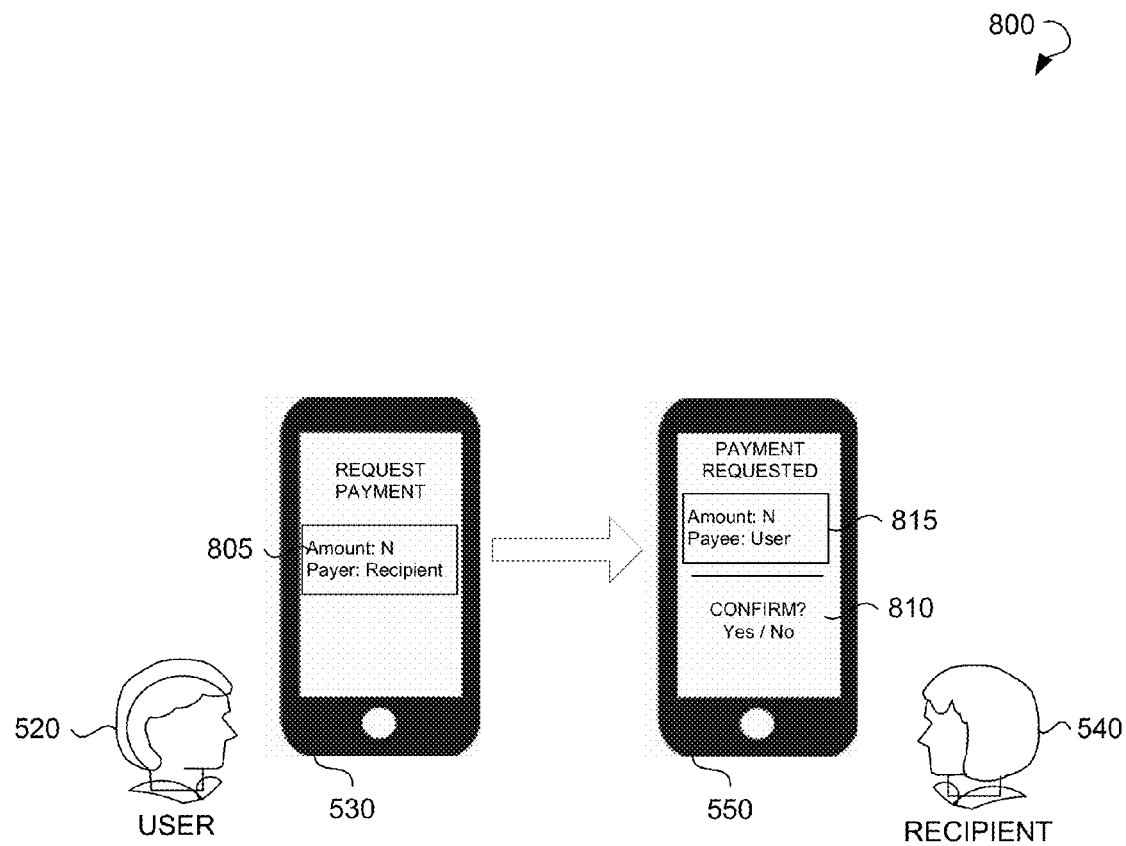
FIG. 8 shows requesting a payment, in accordance with certain embodiments.

FIG. 8 illustrates a representation 800 of requesting a payment, in accordance with some example embodiments. The mobile and wearable device 530 may be associated with a user 520, while the mobile and wearable device 550 may be associated with the recipient 540. The user 520 may provide transaction data 805 (for example, payment amount, request payer, and so forth). The transaction data 805 may be processed by the messaging, calling, and payment system to generate a transaction request 815 using the transaction data 805, user financial data, and recipient financial data stored in the messaging, calling, and payment system. The transaction request 815 may be provided to the recipient 840. Additionally, a capability 810 to confirm or decline the transaction request may be provided. If the recipient 540 confirms the transaction request, a transaction associated with the request is made.

Figure 9:
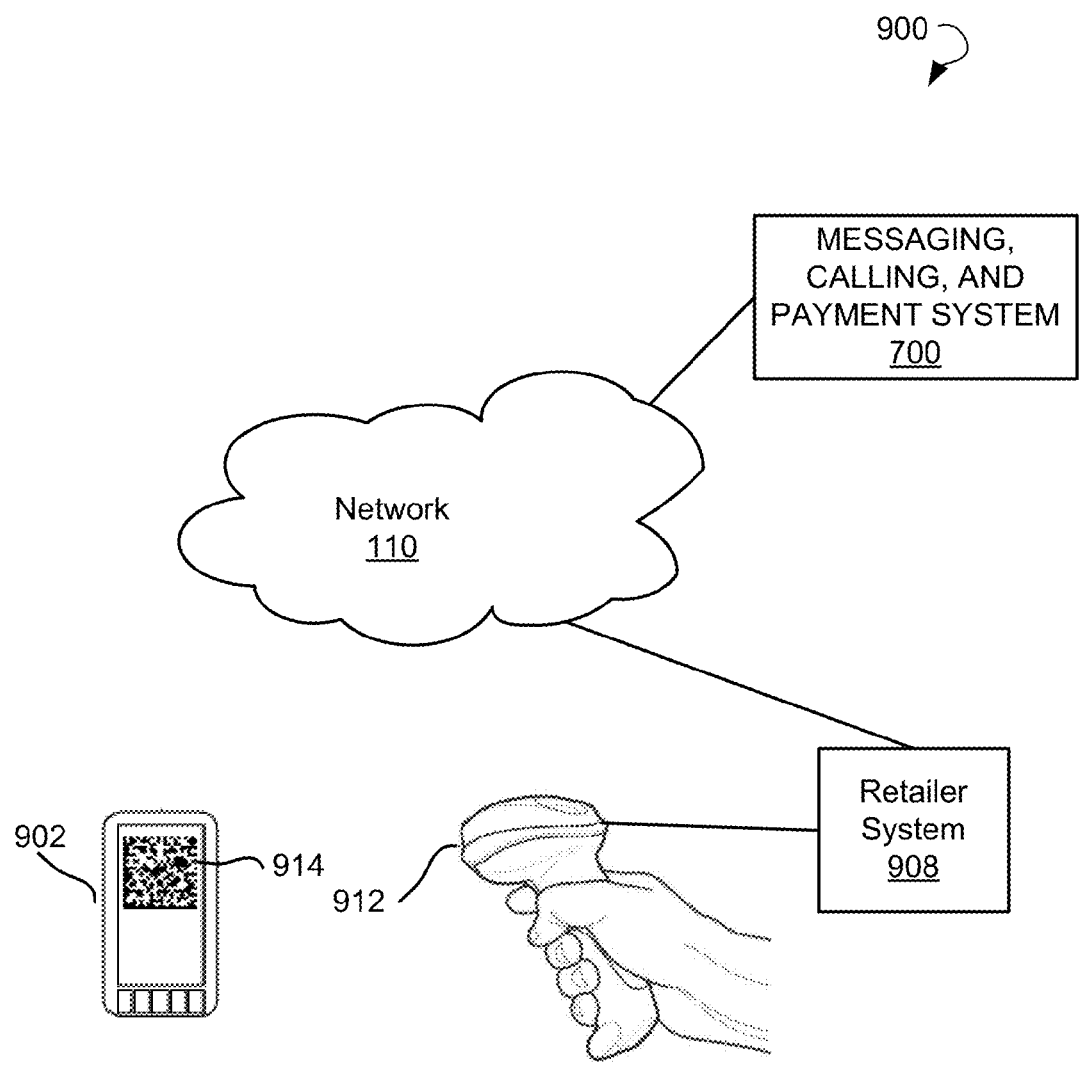
FIG. 9 illustrates identifying the recipient in the messaging, calling, and payment system by scanning a barcode, in accordance with certain embodiments.

FIG. 9 shows identifying 900 the recipient in the messaging, calling, and payment system by scanning a barcode, in accordance with certain embodiments. The messaging, calling, and payment system 700 may be used in retail environments to protect sensitive data of a buyer (recipient). A retailer may register in the messaging, calling, and payment system 700 and make payment requests via a mobile and wearable device 902 of the recipient. To identify the recipient, the recipient identifier in the system 700 may be encoded in a barcode 914 and provided on a display of the mobile and wearable device 902 on a request of the recipient. The retailer may scan the barcode 914 by a barcode scanner 912 associated with a retailer system 904. The retailer system 908 may read the barcode 914 or extract the identifier. Additionally, a payment amount may be provided by the retailer system via the network 110 automatically. The identifier and the payment amount may be provided to the system 700 as transaction data to generate a transaction request.

Figure 10:
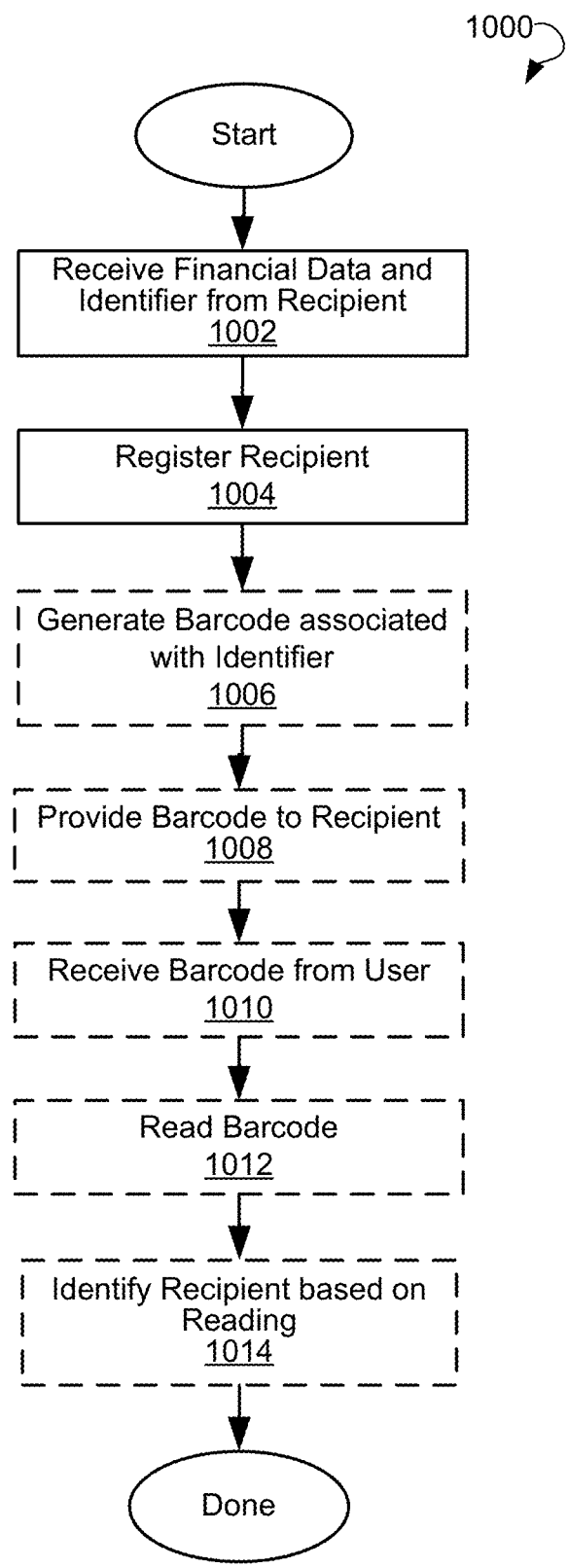
FIG. 10 is an example method for identifying the recipient in the messaging, calling, and payment system by scanning a barcode, in accordance with certain embodiments.

FIG. 10 is a flow chart illustrating a method 1000 for identifying the recipient in the messaging, calling, and payment system, in accordance with certain embodiments. Method 1000 may start with receiving recipient financial data and an identifier from a recipient at operation 1002. The recipient financial data may include recipient banking account data, recipient credit card data, recipient debit card data, recipient virtual currency wallet data, and so forth. Based on the recipient financial data and identifier the recipient may be registered in the messaging, calling, and payment system at operation 1004. Optionally, a barcode encoding the identifier may be generated at operation 1006. The barcode may be provided to the recipient at operation 1008 to be stored on the mobile and wearable device of the recipient, on the barcode may be provided on a display of the mobile and wearable device to be scanned by a user. Optionally, the barcode may be received from the user at operation 1010. In such a way, the recipient and the user may exchange identification information and connect to each other in the messaging, calling, and payment system. The scanned barcode may be read at operation 1012 by the user or, optionally, transmitted to a central component of the messaging, calling, and payment system to be read there. Based on the reading the recipient may be identified at operation 1014. The identifier of the recipient from the barcode may be used by the messaging, calling, and payment system to generate a transaction request or transmitted to the user.

In an example embodiment, the processor of the system for facilitating mobile and wearable device payments and multimedia transfer may be operable to provide facilities for selection of a call mode and a payment transfer mode by a user. Furthermore, the processor may be operable to receive, from the user, the selection of the call mode or the payment transfer mode. Upon selection of the call mode, the processor may be operable to provide a call list and a list of recent calls and transactions. The processor may be operable to receive, from the user, a selection of the recipient from the call list or the list of recent calls and transactions. Upon selection of the payment transfer mode, the processor may be operable to provide a barcode via a display of the mobile and wearable device associated with the user. The barcode may encode the payment data associated with the user and an image of a user face. The processor may be further operable to receive, from the user, a selection of a data transfer mode. The data transfer mode may include scanning a barcode encoding payment data associated with the recipient, selecting the recipient from the contact list stored on the mobile and wearable device associated with the user, and receiving the payment data associated with the recipient via Bluetooth. Furthermore, the processor may be operable to provide data related to location of one or more stores associated with the mobile payment service. Selection of the call mode and the payment transfer mode is shown in detail on FIGS. 11 and 12.

Figure 11:
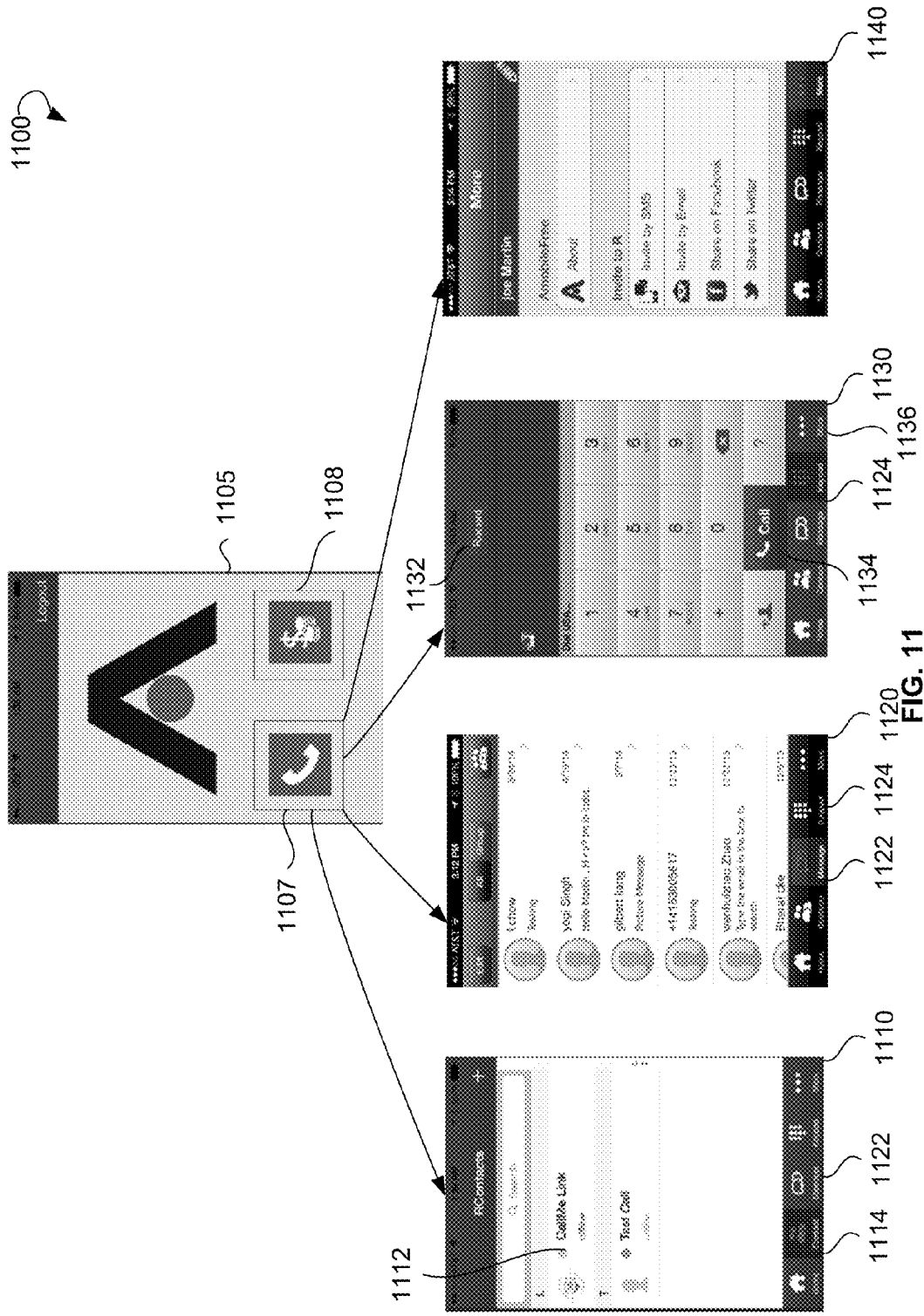
FIG. 11 is a schematic diagram of screens of a user interface for facilitating mobile and wearable device payments and multimedia transfer, in accordance with certain embodiments.

FIG. 11 is a schematic diagram 1100 of example screens 1105, 1110, 1120, 1130, and 1140 of a user interface for facilitating mobile and wearable device payments and multimedia transfer. A screen 1105 may represent options to select a call mode (shown as an icon 1107) and to select a payment transfer mode (shown as an icon 1108). When the user selects the icon 1107, a screen 1110 showing a contact list 1112 may be displayed. The screen 1110 may correspond to a "Contact" icon 1114. The user may select a person to be called, i.e. a recipient, from the contact list 1112. Upon selecting a "Message" icon 1122, a screen 1120 may be displayed. The user may select a person to which the user wants to write a message or may select several persons to write a group message.

Upon selecting a "Keypad" icon 1124, a screen 1130 may be displayed. The user may enter a number of the person to be called or select the person from a list 1132 of recent calls and transactions and press a "Call" icon 1134 to make a call.

Upon selecting a "More" icon 1136, a screen 1140 may be displayed. Using the screen 1140, the user may invite further users to the system for facilitating mobile and wearable device payments and multimedia transfer, for example, by sending a message, sending an e-mail, sharing in social networks, such as Facebook, Twitter, and so forth.

Figure 12:
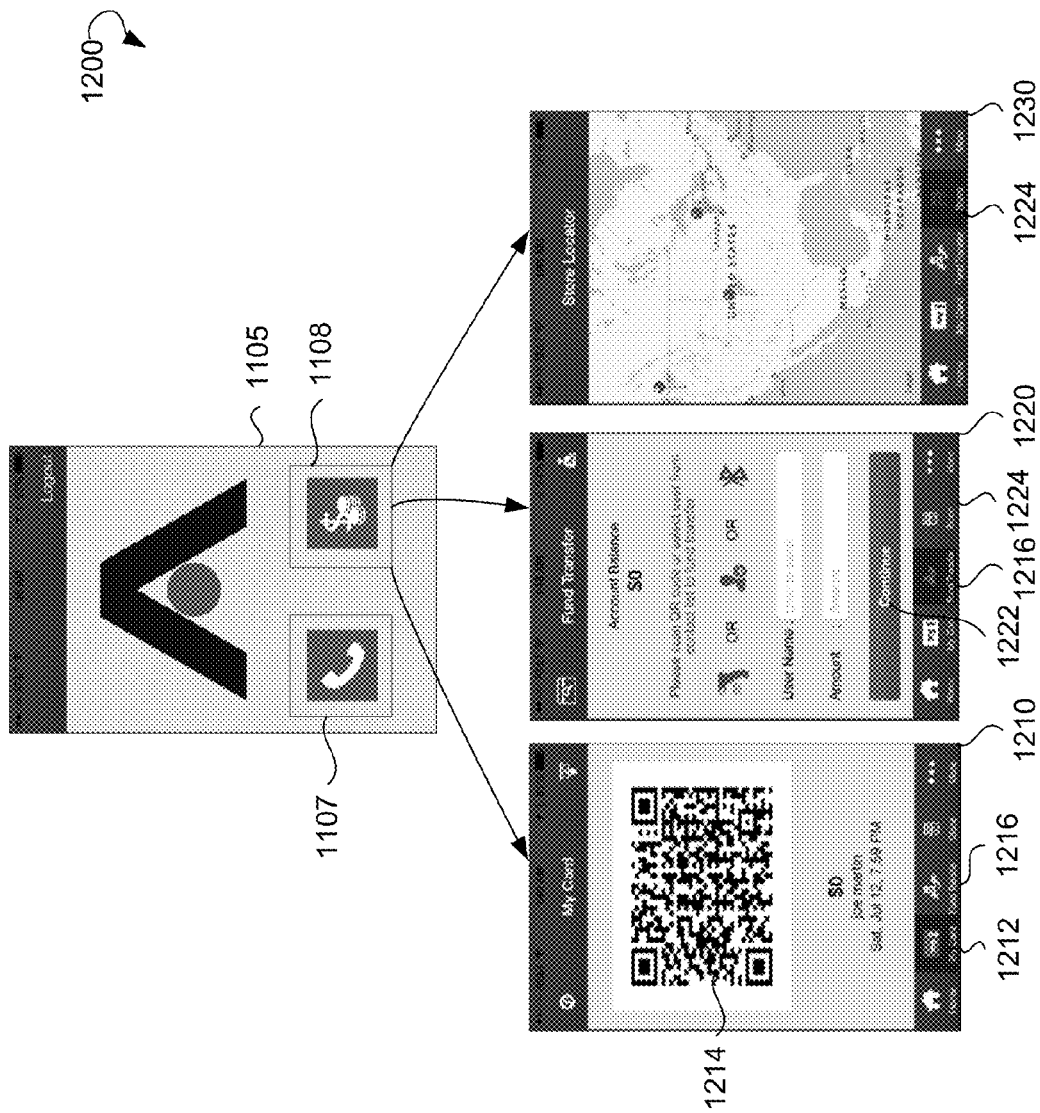
FIG. 12 is a schematic diagram of screens of a user interface for facilitating mobile and wearable device payments and multimedia transfer, in accordance with certain embodiments.

FIG. 12 is a schematic diagram 1200 of example screens 1210, 1220, and 1230 of a user interface for facilitating mobile and wearable device payments and multimedia transfer. When the user selects the icon 1108 on the screen 1105, a screen 1210 may be displayed. The screen 1210 may correspond to a "My Card" icon 1212. A code, such as a QR-code 1214 may be displayed on the screen 1210. The QR-code 1214 may encode the payment data of a payment card of the user, a balance of the payment card, and so forth. When the user wants to make a payment transfer, a "Fund Transfer" icon 1216 may be selected. Upon selection of the "Fund Transfer" icon 1216, a screen 1220 may be displayed. The screen 1220 may represent the current balance of the payment card of the user. The user may select a data transfer mode to receive payment data associated with a recipient to which the payment is to be transferred. For example, the user may scan a QR-code associated with the recipient and encoding the payment data of the recipient. In such a case, the payment transaction may be a face-to-face barcode scanning payment transaction. Furthermore, the user may select the recipient from the contact list or the list of recent calls and transactions. Therefore, the payment transaction may be a remote long distance Internet payment transaction. In an example embodiment, the user may receive the payment data of the recipient via Bluetooth. In this case, the payment transaction may be a short distance Bluetooth payment transaction.

The user may enter a name of the recipient and the amount of the payment to be transferred and select a "Continue" icon 1222 to finalize the payment transfer. Upon selection of a "Store" icon 1224, a screen 1230 may be displayed representing stores at which payment transfer via mobile and wearable devices is available.

Figure 13:
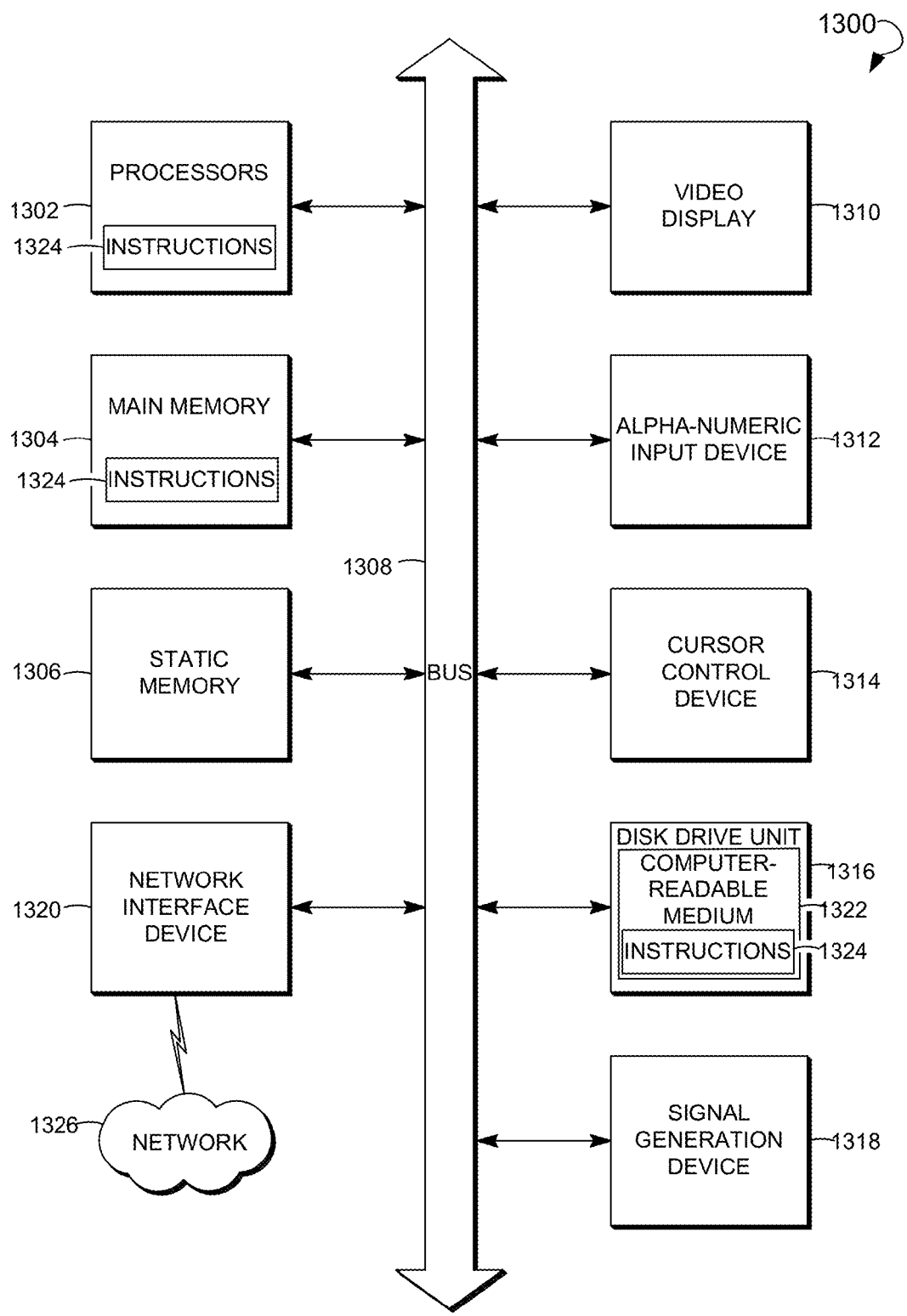
FIG. 13 is a diagrammatic representation of a computing device for a machine in the exemplary electronic form of a computer system, within which a set of instructions for causing the machine to perform any one or more of the methodologies discussed herein can be executed.

FIG. 13 shows a diagrammatic representation of a machine in the example electronic form of a computer system 1300, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor or multiple processors 1302 (e.g., a central processing unit (CPU), a graphics processing unit (GPU), or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 may also include an alphanumeric input device 1312 (e.g., a keyboard), a cursor control device 1314 (e.g., a mouse), a disk drive unit 1316, a signal generation device 1318 (e.g., a speaker) and a network interface device 1320.

The disk drive unit 1316 includes a non-transitory computer-readable medium 1322, on which is stored one or more sets of instructions and data structures (e.g., instructions 1324) embodying or utilized by any one or more of the methodologies or functions described herein. The instructions 1324 may also reside, completely or at least partially, within the main memory 1304 and/or within the processors 1302 during execution thereof by the computer system 1300. The main memory 1304 and the processors 1302 may also constitute machine-readable media.

The instructions 1324 may further be transmitted or received over a network 1326 via the network interface device 1320 utilizing any one of a number of well-known transfer protocols (e.g., Hyper Text Transfer Protocol (HTTP)).

While the computer-readable medium 1322 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, various systems and methods for multimedia capture and payment transactions have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer implemented method for multimedia capture and payment transactions for mobile and wearable devices, the method comprising:
   receiving, by one or more processors, a first input of a user;
   in response to the first input of the user, initiating one or more sensors to capture multimedia to obtain captured multimedia;
   receiving, by the one or more processors, a second input of the user, wherein the first input of the user includes a touch engagement of the user with a display of a mobile and wearable device and the second input of the user includes a touch release of the user from the display of the mobile and wearable device;
   analyzing, by the one or more processors, data associated with the first input of the user and the second input of the user, wherein the analyzing includes determining time between the first input of the user and the second input of the user;
   based on the analysis, selectively selecting, by the one or more processors, a multimedia capture mode or a payment transaction mode, wherein the multimedia capture mode comprises the user using the mobile and wearable device to capture multimedia content, wherein the selection of the multimedia capture mode and the transaction mode is determined by comparison of the time between the first input and the second input with a predetermined time, wherein only a multimedia storing mode or a transaction mode can be selected at a single time, and wherein the multimedia capture mode is associated with a plurality of types of multimedia, wherein each of the plurality of types of multimedia being captured are determined by the time between the first input and second input in the multimedia capture mode; the analysis, selectively selecting, by the one or more processors, one of multimedia storing modes or a payment transaction mode, wherein each of the multimedia storing modes is associated with at least one of a plurality of types of the multimedia;

in response to the selection of the the multimedia capture storing modes, processing, by the one or more processors, the captured multimedia to obtain a type of the multimedia captured in the multimedia capture mode;

storing, by the one or more processors, the type of the multimedia captured and the captured multimedia to a database to obtain a stored type of the multimedia;

in response to the selection of the payment transaction mode, receiving, by the one or more processors, transaction data, wherein the transaction data comprises at least a payment amount and a recipient;

based on the transaction data, user payment data, and recipient payment data, performing, by the one or more processors, a payment transaction, wherein the user payment data and the recipient payment data are stored in the database;

wherein the mobile or wearable devices include at least one of a handheld computing device, a smartphone, a tablet computer, a personal digital assistant, a e-textile item, an activity tracker, a smartwatch, smartglasses, a Global Positioning System (GPS) watch, a mixed reality device, a computer-mediated reality device, a clothing technology device, and a wearable device, the wearable device having a band adapted to secure the wearable device on a human body, the human body including a wrist, an arm, a neck, a head, a leg, a waist, an ear, a finger, and any other part of the human body, wherein the band is adapted to secure the wearable device under, within or on clothing, and wherein the band includes a rechargeable battery configured to power the wearable device.

2. The method of claim 1, wherein the type of the multimedia includes one or more of a text, a video, an image, an audio, and an animation.

3. The method of claim 1, wherein the captured multimedia includes a video; wherein the text is recorded from the captured multimedia based on one or more of text recognition and speech recognition; wherein the image is recorded from the captured multimedia by selecting a frame in the captured multimedia; and wherein the audio is recorded from the captured multimedia by selecting audio content in the captured multimedia; wherein the animation is recorded from the captured multimedia by selecting two or more frames in the captured multimedia and cycling the selected two or more frames.

4. The method of claim 1, wherein the recipient payment data includes one or more of recipient bank account data, recipient debit card data, recipient credit card data, a recipient phone number, and recipient virtual currency wallet data, the recipient payment data being encrypted by assigning a unique key, the unique key being sent to an encryption verification unit having a key storage.

5. The method of claim 1, wherein the payment transaction includes transferring a payment from a payment account associated with the user to a payment account associated with a recipient.

6. The method of claim 1, wherein the payment transaction is performed in a digital currency, the digital currency being customized according to personal data of the user or personal data of the recipient.

7. The method of claim 1, further comprising sending the stored type of the multimedia to the recipient, the stored type of the multimedia being converted into Encrypted Trusted Data Format (ETDF).

8. The method of claim 1, further comprising stopping the one or more sensors upon receiving the second user input.

9. The method of claim 1, wherein the payment transaction is selected from one or more of: a face-to-face barcode scanning payment transaction, a short distance Bluetooth payment transaction, and a remote long distance Internet payment transaction, the payment transaction being based on one or more of the following: based on Unstructured Supplementary Service Data (USSD), Short Message Service (SMS), direct operator billing, a credit card mobile payment, an online wallet, a Quick Response (QR) code payment, contactless near field communication, a cloud-based mobile payment, an audio signal-based payment, a Bluetooth Low Energy (BLE), signal beacon payment, an in-application payment, a social networking payment, a trade token payment, a merchant token payment, a currency token payment, and a direct carrier and bank co-operation.

10. A system for multimedia capture and payment transactions for mobile and wearable devices, the system comprising:

one or more processors operable to:
receive a first input of a user;
in response to the first input of the user, initiate one or more sensors to capture multimedia to obtain captured multimedia;
receive a second input of the user, wherein the first input of the user includes a touch engagement of the user with a display of a mobile and wearable device and the second input of the user includes a touch release of the user from the display of the mobile and wearable device;
analyze data associated with the first input of the user and the second input of the user, wherein the analyzing includes determining time between the first input of the user and the second input of the user;
based on the analysis, selectively selecting, by the one or more processors, a multimedia capture mode or a payment transaction mode, wherein the multimedia capture mode comprises the user using the mobile and wearable device to capture multimedia content, wherein the selection of the multimedia storing mode and the transaction mode is determined by comparison of the time between the first input and the second input with a predetermined time, wherein only a multimedia storing mode or a transaction mode can be selected at a single time, and wherein the multimedia storing mode is associated with a plurality of types of multimedia, wherein each of the plurality of types of multimedia being stored are determined by the time between the first input and second input in the multimedia storing mode; storing modes or a payment transaction mode, wherein each of the multimedia storing modes is associated with at least one of a plurality of types of the multimedia;
in response to the selection of the multimedia capture modes, processing the captured multimedia to obtain a type of the multimedia captured in the multimedia capture mode;

store the type of the multimedia to a database to obtain a stored type of the multimedia and the captured multimedia;

in response to the selection of the payment transaction mode, receive transaction data, wherein the transaction data comprise at least a payment amount and a recipient;

based on the transaction data, user payment data, and recipient payment data, perform a payment transaction, wherein the user payment data and the recipient payment data are stored in the database;

the database comprising computer-readable instructions for execution by the one or more processors; and wherein the mobile or wearable devices include a handheld computing device, a smartphone, a tablet computer, a personal digital assistant, a e-textile item, an activity tracker, a smartwatch, smartglasses, a Global Positioning System (GPS) watch, a mixed reality device, a computer-mediated reality device, a clothing technology device, and a wearable device, the wearable device having a band adapted to secure the wearable device on a human body, the human body including a wrist, an arm, a neck, a head, a leg, a waist, an ear, a finger, and any other part of the human body, wherein the band is adapted to secure the wearable device under, within or on clothing, and wherein the band includes a rechargeable battery configured to power the wearable device.

11. The system of claim 10, wherein the user and the recipient are registered in the system for multimedia capture and payment transactions, the system for multimedia capture and payment transactions being a proprietary, cross-platform instant messaging subscription service built on an open Message Queue Telemetry Transport (MQTT) protocol for mobile and wearable devices and uses for communication one or more of the following: Internet and Bluetooth.

12. The system of claim 10, wherein the user provides the user payment data upon registration, and the recipient provides the recipient payment data upon registration, wherein access to the system is controlled by one or more of the following: a password, a Personal Identification Number (PIN) code, and biometric authorization, the biometric authorization including fingerprint scanning, palm scanning, face scanning, and retina scanning, wherein the scanning is performed using the one or more biometric sensors, the device further comprising a fingerprint reader configured to scan a fingerprint, the scanned fingerprint being matched to one or more approved fingerprints, wherein the access to the system is granted based on the matching.

13. The system of claim 10, wherein the recipient is selected from one or more of a contact list, a list of recent calls, a list of recent transactions.

* * * * *